(12) United States Patent
Salter et al.

(10) Patent No.: US 11,447,008 B2
(45) Date of Patent: Sep. 20, 2022

(54) DISPLAYING VEHICLE FEATURES

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 16/482,767

(22) PCT Filed: Feb. 3, 2017

(86) PCT No.: PCT/US2017/016436
§ 371 (c)(1),
(2) Date: Aug. 1, 2019

(87) PCT Pub. No.: WO2018/144010
PCT Pub. Date: Aug. 9, 2018

(65) Prior Publication Data
US 2019/0351768 A1 Nov. 21, 2019

(51) Int. Cl.
*B60K 35/00* (2006.01)
*G06Q 10/02* (2012.01)
*G06Q 50/30* (2012.01)

(52) U.S. Cl.
CPC ............ *B60K 35/00* (2013.01); *G06Q 10/02* (2013.01); *G06Q 50/30* (2013.01); *B60K 2370/161* (2019.05)

(58) Field of Classification Search
CPC .. B60K 35/00; B60K 2370/161; G06Q 10/02; G06Q 50/30
USPC ........................................................... 701/36
See application file for complete search history.

(56) References Cited

U.S. PATENT DOCUMENTS

| | | | |
|---|---|---|---|
| 8,010,906 B1 | 8/2011 | Sinnard et al. | |
| 10,853,881 B1* | 12/2020 | LaBarre | G06Q 40/08 |
| 2010/0317420 A1* | 12/2010 | Hoffberg | G06Q 30/0207 463/1 |
| 2011/0053506 A1 | 3/2011 | Lemke et al. | |
| 2012/0022776 A1 | 1/2012 | Razavilar | |
| 2012/0221188 A1 | 8/2012 | Kelly | |
| 2014/0278599 A1 | 9/2014 | Reh et al. | |
| 2014/0310124 A1 | 10/2014 | Schifferle | |

OTHER PUBLICATIONS

Notification of Transmittal of International Search Report and Written Opinion dated Jun. 1, 2017 regarding International Application No. PCT/US2017/016436 (17 pages).

* cited by examiner

*Primary Examiner* — Gertrude Arthur Jeanglaude
(74) *Attorney, Agent, or Firm* — Brandon Hicks; Bejin Bieneman PLC

(57) ABSTRACT

A computer that includes a processor and memory storing instructions executable by the processor. The computer may be programmed to: determine feature-selection data; determine that a mobile device is within a proximity threshold of a vehicle; and in response to the determinations, control a vehicle display in accordance with the feature-selection data.

20 Claims, 5 Drawing Sheets

DISPLAYING VEHICLE FEATURES

BACKGROUND

When renting a vehicle, a customer typically approaches a customer service representative, waits in line, and eventually requests a vehicle having one or more features. The representative may use a computer to search a database of available vehicles on a nearby lot. Upon finding a vehicle suitable for the customer, the customer may provide the representative a deposit (e.g., via a credit card). Afterwhich, for the selected vehicle, the customer may be given a receipt and ignition key and instructed to find the vehicle in a particular region on the lot. As many vehicles may appear to be the same, the customer may have some degree of difficulty finding the particular vehicle. After ultimately finding and entering the vehicle, the customer often drives to a gate where another representative validates the customer's receipt before permitting him/her to remove the vehicle from the premises. Upon validation, the customer is free to drive the car off the lot according to the terms of his agreement. Then, when the customer returns the vehicle, yet another customer service representative may process a payment for the customer before permitting him/her to leave (e.g., using the previously provided credit card).

DETAILED DESCRIPTION

Figure 1:
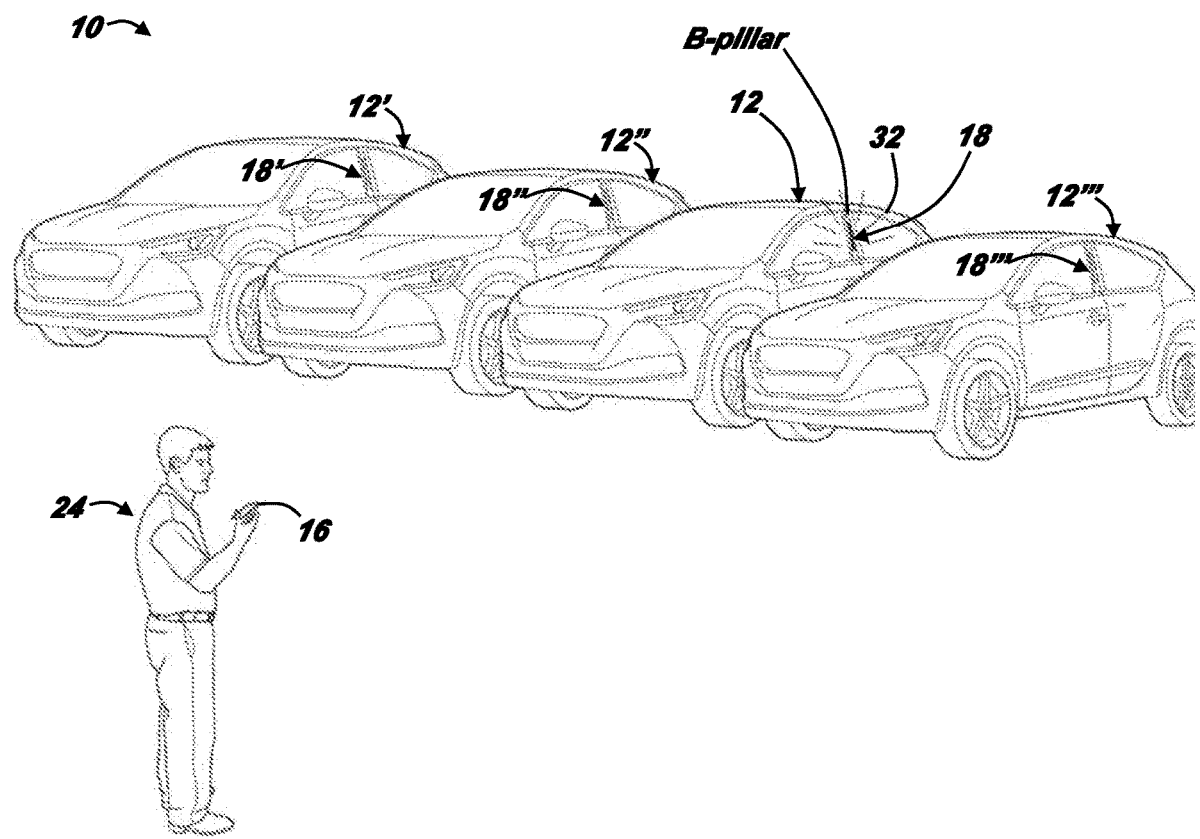
FIG. 1 is a perspective view of a row of rental vehicles and a user carrying a mobile device.

With reference to FIGS. 1-4, wherein like numerals indicate like parts throughout the several views, there is shown a feature confirmation system 10 for a vehicle 12. The system 10 may enable a person to select a vehicle based on certain desirable features and then help the person locate the selected vehicle 12. In general, the system includes an onboard computer 14 which can communicate with a mobile device 16 (e.g., such as a Smart phone) and an integrated vehicle display 18. In some examples, the display 18 may include a homing device 20 and a feature checklist screen 22, and the homing device 20 may be triggered by a proximity of the mobile device 16. The display 18 can be particularly helpful in rental car applications. For example, the homing device 20 may enable a user 24 to locate a rental vehicle 12, and the feature checklist screen 22—portraying features previously selected by the user 24—may be used further to validate that the user 24 has identified the correct rental vehicle 12 (e.g., from among a number of other vehicles 12', 12", 12'"). This may be particularly helpful when vehicles 12, 12', 12", 12'" appear to be similar or identical—e.g., having a common color, make, model, and year (although each vehicle 12, 12', 12", 12'" may have at least some different vehicle operational features). While a rental vehicle 12 is used in the description that follows as one example, other examples are possible as well (e.g., taxi vehicles, shared vehicles, and other non-rental vehicle implementations).

Referring to FIG. 1, the vehicle 12 may be a passenger car or any other suitable vehicle having display 18. For example, vehicle 12 also could be a truck, sports utility vehicle (SUV), recreational vehicle, a bus, marine vessel, aircraft, or the like that includes the computer 14 and display 18. Vehicle 12 may be operated in any one of a number of autonomous modes. Currently and/or in the future, it is contemplated that autonomous temporary-use vehicles (e.g., such as taxi or rental car vehicles) will be available at a rental car facilities and/or ride-share corrals. User 24 could approach the facility or corral and select an autonomous vehicle or pick up a previously-selected vehicle having certain enumerated features.

As used herein, vehicle features are attributes or functionalities which are available on vehicle 12, the attributes or functionalities being provided by hardware located on vehicle 12, software executable by the hardware, or combination thereof. Thus, a standard feature is one in which a vehicle manufacturer includes with all vehicles having a common make, model, and year; whereas, a non-standard feature is one which is not available on all vehicles having a common make, model, and year. To illustrate, a combustion engine having a predetermined size and torque-capability may be a standard feature, but (with respect to a particular make, model, and year) a larger engine, a more powerful engine, or an electric engine may be a non-standard feature (e.g., or an upgraded feature). In the description which follows, vehicle 12 may have at least one non-standard feature; a non-limiting list of non-standard features includes some predefined level of autonomous vehicle control, an advanced vehicle snow system, an advanced vehicle map system, an automotive theater system, and a vehicle disinfection system. As described more below, computer 14 may be programmed to selectively actuate or de-actuate at least some of these and other non-standard features. Further, as described more below, display 18 may be configured to illuminate a label indicating that a non-standard feature is available on vehicle 12 or has been particularly selected by user 24 (e.g., enabled by computer 14 as a result of the user's selection so that user 24 may utilize its functionality during, e.g., a rental term).

As used herein, autonomous vehicle control pertains to vehicle 12 operating in an autonomous mode, as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

Figure 2:
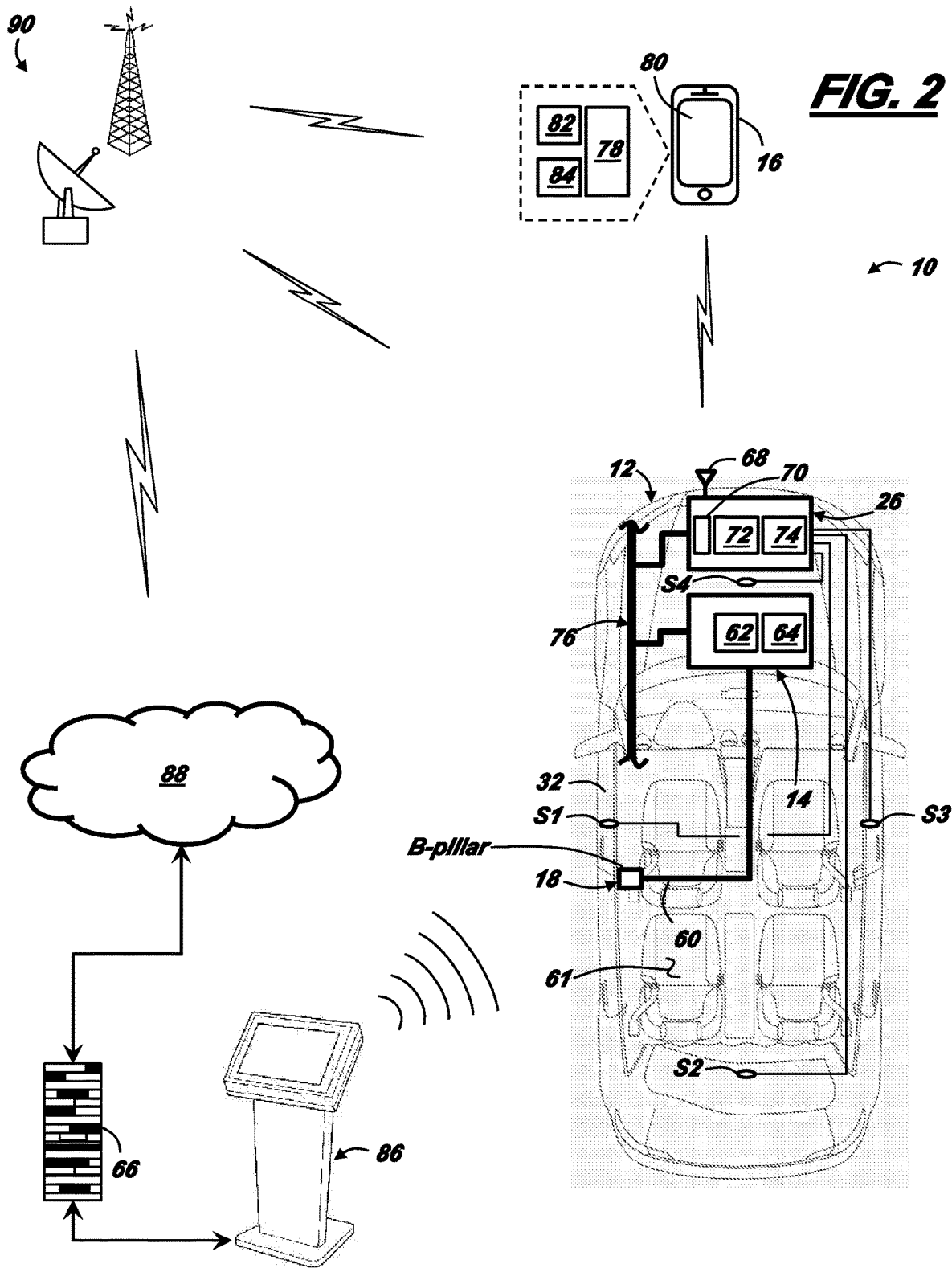
FIG. 2 is a schematic diagram of a feature confirmation system that includes a vehicle having an integrated display.

The vehicle 12 may have any suitable communication architecture. FIG. 2 illustrates a number of interconnected computer modules—e.g., display 18, computer 14, a second computer 26, and a network connection 76. Each will be described in detail below.

Figure 3:
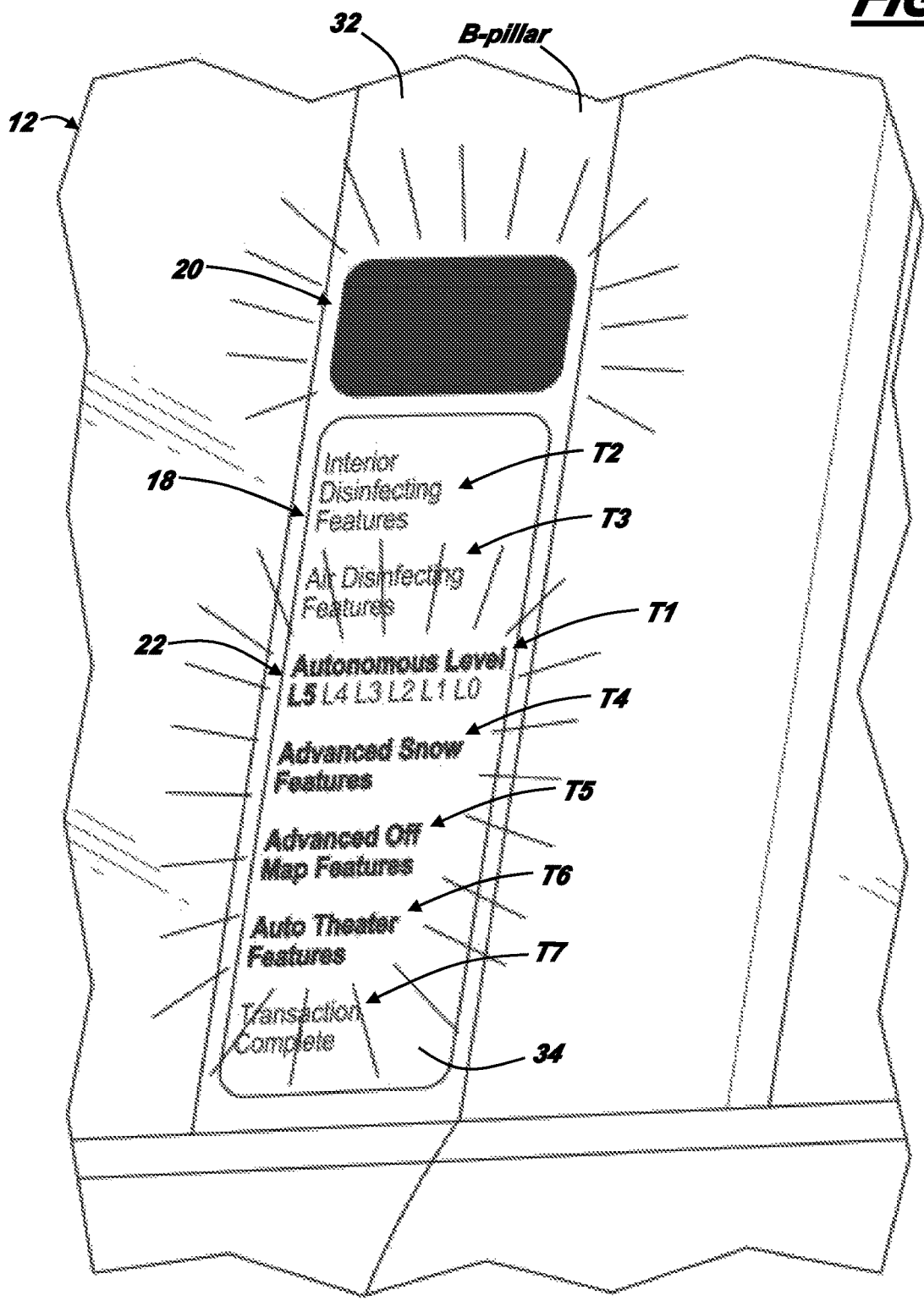
FIG. 3 is a perspective view of the display shown in FIG. 2, facing vehicle-outwardly of a vehicle pillar.

Display 18 can be carried by a vehicle body 32 (e.g., in one of the vehicle pillars (e.g., pillars A, B, C, etc.)). In FIGS. 1-3, as an example, display 18 is located in one of the B-pillars which forms part of body 32. The body 32 may support the vehicle 12. The body 32 may be of a unibody construction in which at least some of the body 32 is exposed and may present a class-A surface (not numbered), i.e., a surface specifically manufactured to have a high-quality, finished aesthetic appearance free of blemishes. The body 32 may, alternatively, be of a body-on-frame construction, or of any other suitable construction. The body 32 may be formed of any suitable material, for example, steel, aluminum, etc.

Figure 4:
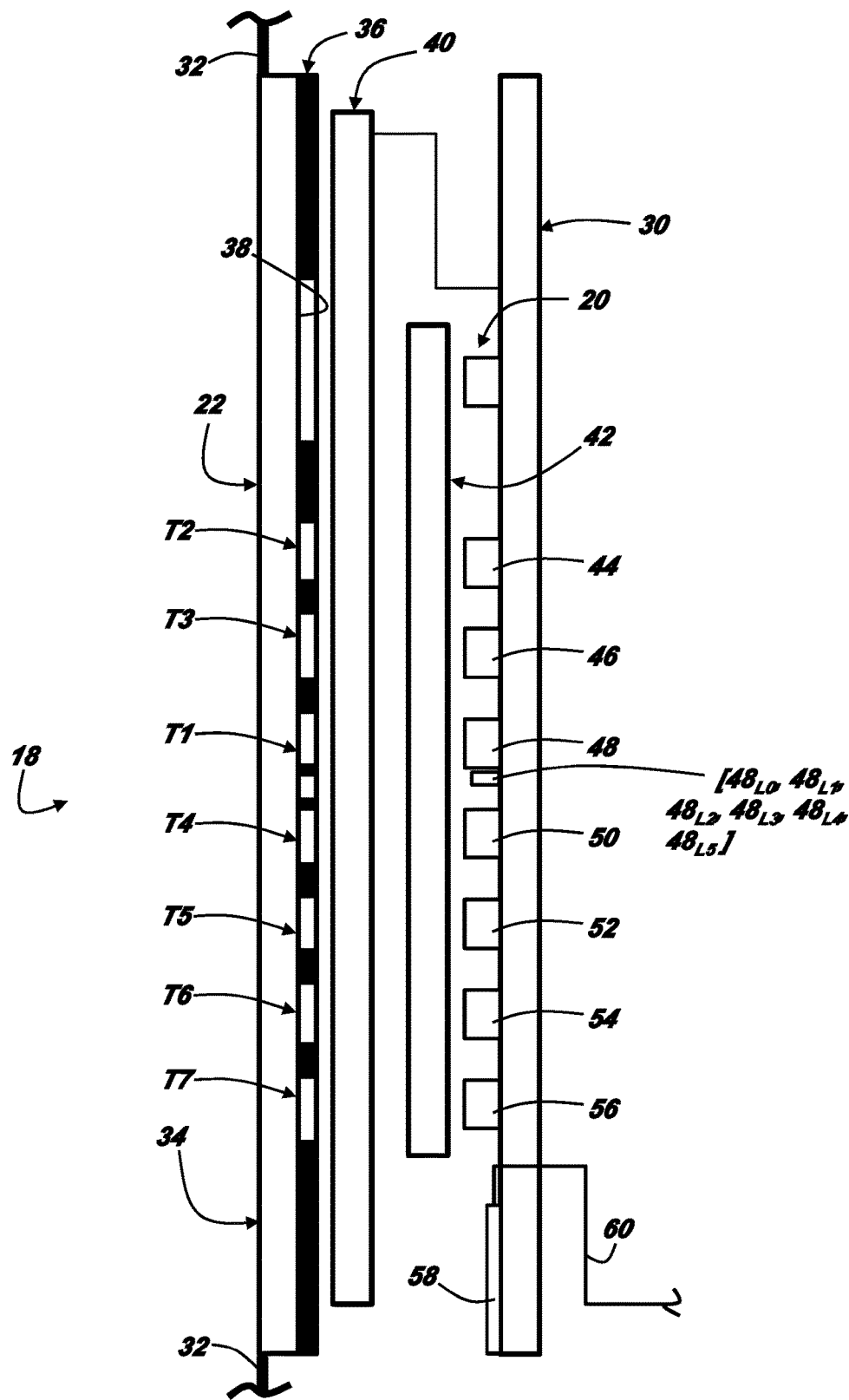
FIG. 4 is a schematic diagram illustrating a sectional view of the integrated display.

As best shown in FIG. 4, display 18 can include the homing device 20 at least partially coupled to a circuit card 30 (e.g., a printed circuit board or the like). As used herein, the homing device 20 may be any electronic device configured to emit a homing signal, and the homing signal may include at least one of a visible signal, an audible signal, or a tactile signal. In the illustrated implementation, the homing device 20 includes a light source (e.g., a light emitting diode or LED) mounted to card 30 which may emit a visible signal in the form of an identification sequence to uniquely identify vehicle 12 to user 24 (e.g., from among vehicles 12', 12", 12''', etc.). As used herein, an identification sequence is a series of light pulses, a series of vibration pulses, a series of audible pulses, or a combination thereof having a predetermined duration. For example, the illustrated homing device 20 emits an identification sequence as a series of light pulses (within the visible spectrum; e.g., 390-700 nanometers (nm)), wherein the light pulses include any suitable change in brightness (or intensity), any suitable change in emission frequency (e.g., change in color), or both. Thus, for purposes of illustration only (and not to be limiting), an identification sequence could comprise homing device 20 consecutively emitting: a red light pulse (for 0.5 seconds (s)), a green light pulse (e.g., for 0.5 s), and then a blue light pulse (e.g., for 0.5 s). In another non-limiting example, an identification sequence could comprise homing device 20 emitting several consecutive pulses of light: a flash of light having a first intensity, followed by either an absence of light or a pulse of light having a second intensity (different that the first intensity)—repeated two or more times to comprise the sequence. In either of these examples, the identification sequence could be followed by a pause (e.g., of predetermined duration) and then repeated again. Furthermore, the duration of each pulse could be varied in other examples. The series of pulses could comprise a single frequency (e.g., monochromatic emissions) or multiple frequencies (e.g., multiple colors). These are merely examples; an identification sequence could include other variations or pulse arrangements as well.

In yet another example, homing device 20 could be a piezo- or other like tone generator or buzzer adapted to provide audible pulse(s)—e.g., an identification sequence of predetermined sounds (e.g., beeps, chirps, tunes, etc.). Or homing device 20 could be a piezo- or other like vibrator adapted to provide tactile pulse(s)—e.g., a sequence of shocks or vibrations within the body 32 of vehicle 12. Such audible and/or tactile pulses may assist visually-impaired users desiring to use vehicle 12 (e.g., in a fully autonomous mode). Again, these are merely examples; other homing device 20 examples are possible.

While locating homing device 20 within display 18 may minimize the vehicle weight, may minimize spatial requirements (e.g., for wiring harnesses), may reduce potential failure points, locating homing device 20 in display 18 is not required. For example, homing device 20 could be located in other locations on vehicle 12 (e.g., on a vehicle roof, near a vehicle grill, etc.). Further, vehicle 12 could have multiple homing devices 20 (e.g., located fore and aft, starboard and board, etc.).

As shown in FIG. 4, display 18 may include a number of layers or other components. For example, display 18 may include a transparent layer 34 having decorative layer 36 adjacent an inwardly-facing side 38 thereof. The transparent layer 34 may face vehicle-outwardly, and the decorative layer 36 may comprise an ink pattern comprising text, symbols, or the like; the decorative layer 36 may be arranged to block light in some portions and permit light to pass through in other portions (e.g., allowing light to pass through text, symbols, etc. formed by layer 36). Examples of text are discussed below.

The display 18 also may comprise a touch-sensitive layer 40; this is shown between transparent layer 34 and circuit card 30 (however, this is merely an example); e.g., layer 40 could be integral to layers 34 and/or 36. Non-limiting examples of touch-sensitive layer 40 include touch-sensitive devices such as a capacitive-touch device, a resistive-touch device, or the like—e.g., to enable display 18 to be an input device, as explained below. In at least one example, display 18 further may include a diffuser layer 42 located proximate to a plurality of selectively-actuatable light sources 44, 46, 48, $48_{L0}$, $48_{L1}$, $48_{L2}$, $48_{L3}$, $48_{L4}$, $48_{L5}$, 50, 52, 54, 56 (e.g., collectively described hereafter as light sources 44-56). Light sources 44-56 may be located on circuit card 30 in a region relative to the feature checklist screen 22. In one example, each of light sources 44-56 may be light-emitting diodes or LEDs. Layer 42 may diffuse or spread light from sources 44-56. In at least one implementation, layer 42 could be integral with layer 34. In the illustrated example, each of the light sources 44-56 correspond to the feature checklist screen 22—where light is permitted to pass through the decorative layer 36 (where text or symbols are located). In this manner, when a particular light source selectively is illuminated (e.g., one of LEDs 44-56), only the corresponding text and/or symbol may be illuminated (e.g., through layer 34). The quantity of light sources 44-56 is exemplary and other quantities, as well as other display component arrangements are also possible.

Optionally, display 18 may include a microprocessor 58 programmed to control some characteristics of the homing signal and/or the actuation of the homing device 20 and/or light sources 44-56. The microprocessor 58 may be coupled to computer 14 via connection 60 (e.g., which may be a wired or wireless, discrete or network connection).

One arrangement of feature checklist screen 22 is shown in FIG. 3—e.g., illustrating several non-limiting examples of text labels; namely: Autonomous Level T1 (e.g., showing levels L0, L1, L2, L3, L4, L5), Interior Disinfecting Features T2, Air Disinfecting Features T3, Advanced Snow Features T4, Advanced Off Map Features T5, Auto Theater Features T6, and Transaction complete T7. Autonomous vehicle control features (e.g., associated with label T1) were discussed above; thus, depending on the configuration of vehicle 12, the text associated with one of levels L0-L5 may be illuminated (controlled by computer 14)—e.g., selectively actuating light sources 48 and 48$_{L5}$ (see also FIG. 4) and thus, illuminating "Autonomous Level" and "L5."

Vehicle 12 may include a vehicle disinfection system (not shown) that includes features for disinfecting vehicle cabin surfaces and/or disinfecting air. For example, such a system may utilize UV lighting and titanium dioxide (TiO$_2$) coatings on trim and interior components to disinfect one or more vehicle surfaces; if this feature is available in vehicle 12, label T2 (illustrated as "Interior Disinfecting Features") may be illuminated. Or for example, this system may have one or more computers (not shown)—which can be triggered by computer 14—that enable device(s) to provide air sterilization and/or disinfection. For example, such devices may emit ultraviolet (UV) light and/or ozone (O3) within a vehicle cabin 61 in order to disinfect the air. (See FIG. 3, label T3, illustrated as "Interior Disinfecting Features.") In FIG. 3, these features are not illuminated—e.g., indicating that they are not available (or not enabled) on the particular vehicle 12.

Vehicle 12 may include an advanced vehicle snow system (not shown) that includes one or more computers (not shown)—which can be triggered by computer 14—to use one or more extreme weather driving algorithms when the vehicle 12 is operating in an autonomous mode. For example, skilled artisans appreciate that driving vehicle 12 in a fully autonomous mode (L5) on snowy or icy roadways presents unique challenges due to traction, control, visibility, other driver action prediction, etc. Thus, when computer 14 enables the advanced vehicle snow system, the vehicle 12 may better navigate snowy, icy, etc. roadways. In FIG. 3, label T4 is illuminated (indicating that the feature is enabled)—e.g., illustrated as "Advanced Snow Features."

An advanced vehicle map system (not shown) in vehicle 12 may include one or more computers (not shown)—which can be triggered by computer 14—that use enhanced mapping and/or navigational algorithms during an autonomous mode. For example, in a fully autonomous mode (L5), use of so-called localization data may be limited or unavailable. For example, based on the vehicle's location, localization data may be unavailable to vehicle 12, or it may not be available to any vehicle since the particular roadway has not been adequately mapped. Thus, these enhanced algorithms may permit L5 autonomous mode operation on such roads (e.g., on forest service roads, so-called two-track trails, dirt or gravel backroads, etc.). In FIG. 3, label T5 is illuminated (e.g., "Advanced Off Map Features").

An automotive vehicle theater system (not shown) in vehicle 12 may include one or more computers (not shown)—which can be triggered by computer 14—that present an in-vehicle theater experience within vehicle cabin 61. For example, using such a system, the user 24 may permit the vehicle 12 to operate in a L5 autonomous mode while watching video data with surround sound while traveling to the user's destination. Vehicles equipped with this system also could include additional audio sound-proofing, displays, etc. In FIG. 3, display 18 indicates that "Auto Theater Features" are available or enabled in vehicle 12 (label T6).

In the least illustrative example of FIG. 3, label T7 ("Transaction Complete") may be illuminated when user 24 is finished using vehicle 12—e.g., when vehicle 12 delivers user 24 to his/her destination and the user pays for rental use of the vehicle (e.g., user 24 may pay via the vehicle 12, mobile device 16, or the like). Thus, computer 14 may illuminate "Transaction Complete" so that user 24 can receive visual confirmation that no fee is owed.

Returning again to the schematic diagram of FIG. 2, the diagram shows computer 14 coupled to display 18 so that it can control at least some functions thereof. Computer 14 may be a single computer (e.g., such as a body control module) or may comprise multiple computing devices; further, processing functions of computer 14 may be dedicated to display 18 or may be shared with other vehicle systems and/or subsystems. Computer 14 may comprise a processor or processing circuit 62 coupled to memory 64. For example, processor 62 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 64, which enable the computer 14, among other things, to control display 18, to communicate with mobile device 16, and/or to communicate with a server 66 (e.g., directly or indirectly via computer 26, as will be explained below).

Memory 64 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 64 may store one or more computer program products which may be embodied as software, firmware, or the like.

Computer 26 may be configured to wirelessly communicate with other electronic devices—e.g., using cellular technology, short range wireless communication technology, or a combination thereof (e.g., using one or more antennas 68 and one or more wireless chipsets 70). Computer 26 also may have a processor or processing circuit 72 and computer memory 74 coupled to the processor 72—and in at least one example, the hardware 72, 74 may be identical to that described above with respect to computer 14; therefore, the processor 72 and memory 74 will not be re-described here. However, the instructions stored in memory 74 and executable by processor 72 may differ in at least some respects. For example, computer 26 may be programmed to send and receive messages using a cellular protocol (e.g., such as LTE, GSM, CDMA, etc.) and/or any suitable short range wireless communication protocol (e.g., such as Wi-Fi, Wi-Fi Direct, Bluetooth, Bluetooth Low Energy (BLE), Near-Field Communication (NFC), etc.). As will be described more below, computer 26 can serve as a gateway between computer 14 and extra-vehicle devices (e.g., such as server 66 and mobile device 16)—e.g., sending messages from computer 14 and receiving messages directed to computer 14 (e.g., messages pertaining to computer 14 controlling display 18).

Computer 26 may be coupled to a number of short-range wireless receivers S1, S2, S3, S4; four are illustrated; however, any suitable quantity may be used. Receivers S1-S4 may be used to detect short-range wireless communication signals—in one example, they are configured to receive BLE signals and pass any data to computer 26. Furthermore, using this information and known techniques, computer 26 may be programmed to determine a relative distance between the sending device and vehicle 12. One such non-limiting example includes a triangulation technique; however, other techniques can be employed. Receivers S1-S4 could also be two-way devices (e.g., transceivers) which receive wireless information and also transmit wireless information (e.g., from computer 26). While the receivers S1-S4 are shown coupled to computer 26; in at least one example, the relative distance between vehicle 12 and the sending device (e.g., mobile device 16) could be calculated instead by computer 14. Or determining the relative distance at computer 14 could comprise computer 14 sending an inquiry message to computer 26 and receiving a determined distance (e.g., calculated by computer 26) instead.

Computers 14, 26 may be coupled together to communicate via any suitable wired or wireless network connection 76. In at least one example, the connection 76 is a controller area network (CAN) bus, Ethernet, Local Interconnect Network (LIN), a combination thereof, or the like. However, this is not required. For example, connection 76 could include one or more discrete connections instead. In one example, connection 60 may be part of network connection 76; although this is not required.

As described above, mobile device 16 may communicate with computer 14 (e.g., directly or indirectly via computer 26). In general, mobile device 16 may be any portable electronic device adapted to wirelessly communicate with other electronic devices. In one non-limiting example, mobile device 16 includes one or more wireless chipsets 78 (e.g., for cellular communication and/or for short-range wireless communication), an interactive touch screen or similar display 80 (e.g., enabling input and output), a processor 82, and memory 84. Chipset(s) 78 may be configured according to one or more protocols—non-limiting examples of which were described above.

In at least one example, the hardware 82, 84 may be identical to that described above with respect to computer 14; therefore, the processor 82 and memory 84 will not be re-described here. However, the instructions stored in memory 84 and executable by processor 82 may differ in at least some respects; e.g., memory 84 may store one or more different computer program products which may be embodied as software, firmware, or the like. Instructions executable by processor 82 may cause mobile device 16 to communicate with server 66 and/or to send reservation data to computer 14 so that the user 24 of mobile device 16 may use (at least temporarily) vehicle 12. Reservation data can include information pertaining to renting or leasing the vehicle 12. For example, in at least one non-limiting example, reservation data includes vehicle feature data and/or information pertaining to the homing signal. Vehicle feature data can be used by computer 14 to determine which portion of the feature-checklist screen 22 to illuminate; this will be described in greater detail below.

In addition, processor 82 may be used to identify vehicle 12 (e.g., using wireless communication). Other programming instructions will be described in greater detail below. Non-limiting examples of mobile device 16 include a cellular telephone, a personal digital assistant (PDA), a Smart phone, a laptop or tablet computer having two-way communication capabilities (e.g., via a land and/or wireless connection), a netbook computer, a telematics device (e.g., located in another vehicle), and the like.

Server 66 may be any suitable computer or computing system having one or more processors and memory which may be linked to one or more computer databases—the server 66 may be specially-configured to communicate with rental vehicles, e.g., such as vehicle 12. In one example, server 66 is connected to a kiosk 86 (e.g., a display having input/output capability) which enables user 24 to select a suitable rental vehicle (e.g., 12)—e.g., at a rental car facility. According to one example, the user's selection is based on available features of vehicle 12 (and e.g., the user 24 may enter vehicle feature data into kiosk 86). The kiosk 86 may be used to pay for a specific vehicle having desired features or even to pay a surcharge for certain non-standard features on vehicle 12.

Kiosk 86 also may serve as a wireless node and may be able to communicate with vehicle 12—e.g., including when the vehicle ignition is OFF. As will be explained below, kiosk 86 and/or mobile device 16 may be used to wirelessly send reservation data to vehicle 12. And in response to the vehicle 12 receiving this reservation data, computer 14 may store at least part of this information (e.g. homing signal information and/or vehicle feature data). As will be explained more below, computer 14 may extract the vehicle feature data and compare the associated features with features enumerated on its feature checklist screen 22 (on display 18). Those features (in the vehicle feature data) which correspond to available features on feature checklist screen 22 may be stored as feature-selection data. Thus, as used herein, feature-selection data may form the logical basis by which computer 14 selectively actuates light sources 44-56 associated with feature checklist screen 22. (Note: feature-selection data may include features which are standard on vehicle 12 (e.g., according to the model, package, etc.) and/or features which are non-standard and which may be enabled by computer 14 (or other vehicle computer). Kiosk 86 is merely an example; and is not required in all implementations.

Server 66 may be connected to a land communication network 88 that comprises any suitable wired network which is coupled to a wireless communication network 90, wherein the land communication network 88 enables connectivity to public switched telephone network (PSTN) such as that used to provide hardwired telephony, packet-switched data communications, internet infrastructure, and the like. Wireless communication network 90 may include satellite communication architecture and/or may include cellular telephone communication over wide geographic region(s). Thus, in at least one example, network 90 includes any suitable cellular infrastructure that could include eNodeBs, serving gateways, base station transceivers, and the like. Further, network 90 may utilize any suitable existing or future cellular technology (e.g., including LTE, CDMA, GSM, etc.). Both communication networks 88, 90 are generally known in the art and will not be described further herein.

Figure 5:
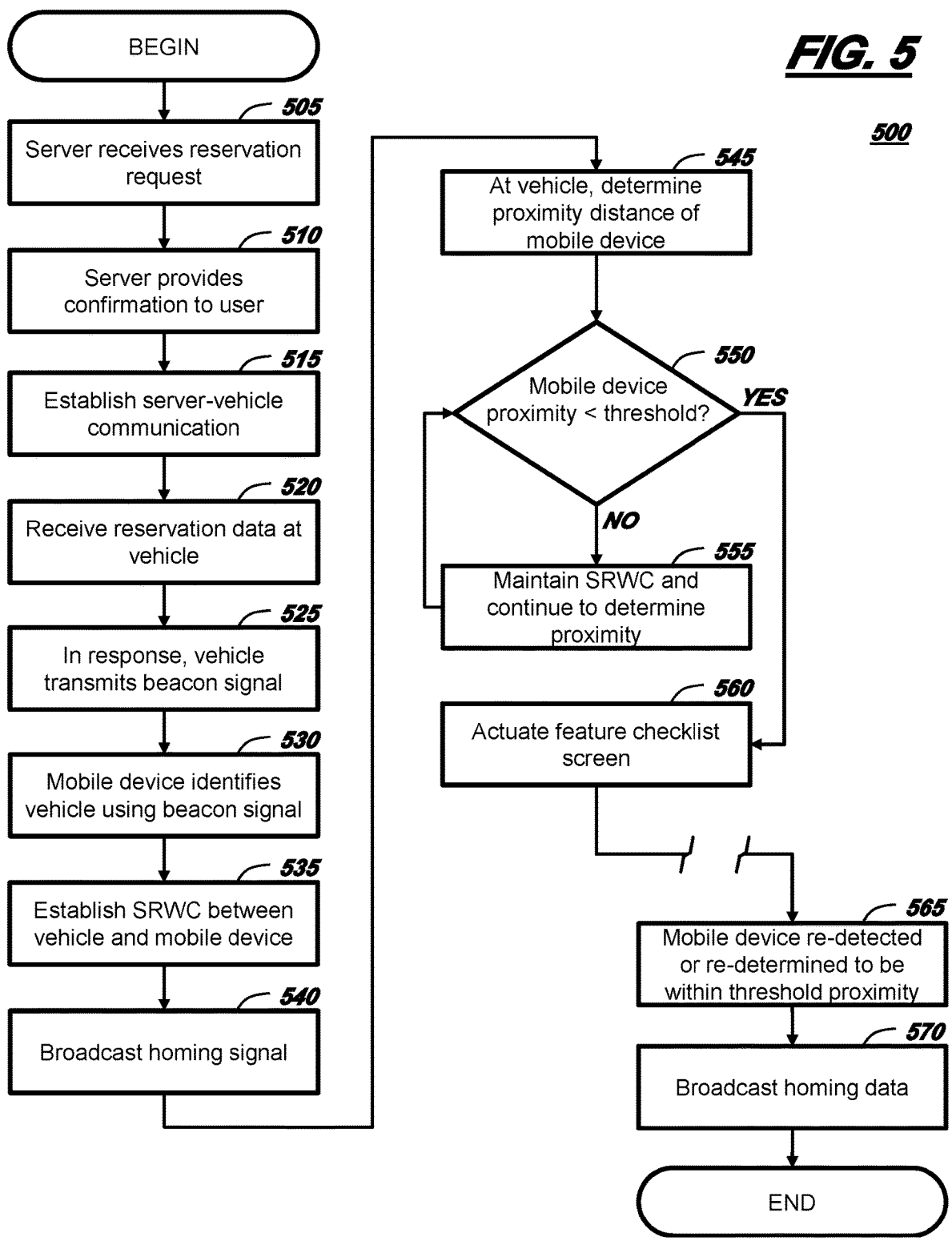
FIG. 5 is a flow diagram of a process of providing information pertaining to the vehicle of FIG. 2 via the display shown in FIG. 2.

Turning now to FIG. 5, a process 500 is shown for providing vehicle 12 information via display 18. In at least one example, process 500 begins with block 505 wherein server 66 receives a reservation request from user 24 (e.g., derived from kiosk 86 or mobile device 16). The reservation request includes information pertaining to the selection of vehicle 12—e.g., including but not limited to when vehicle 12 will be used by user 24 (e.g., start date, end date, etc.), a unique identifier associated with vehicle 12, and/or an indication of features available on vehicle 12 which may have influenced the user's selection (which may include some non-standard features which may be enabled to an ON state by computer 14).

In block 510 which follows, server 66 may provide confirmation message to the user 24. For example, in the kiosk 86 example, the confirmation message may be displayed or otherwise provided via the kiosk 86. The confirmation message may display vehicle information, feature information, etc. and may include information pertaining to a homing signal which will be used by vehicle 12 in order to assist user 24 in identifying vehicle 12 (e.g., which may be parked somewhere nearby). For example, with respect to the homing signal, kiosk 86 may display or otherwise provide a sample homing signal (e.g., such as displaying a light pulse sequence of red-green-blue or the like)—e.g., the sample mimicking the actual homing signal which may be displayed at vehicle 12 when the user 24 is relatively close to the vehicle, as explained below). Of course, this is merely one example. In other examples, kiosk 86 could provide an audible and/or tactile signal sample as well; further, in one example, kiosk 86 may permit the user 24 to select or preconfigure the homing signal. Where the user 24 does not configure his/her own homing signal, kiosk 86 may display a default homing signal.

Alternatively, or in addition thereto, the confirmation message could be sent wirelessly to the user's mobile device 16 and include the same or similar information (e.g., sent via SMS, packet data, voice over IP, or the like). Confirmation messages sent to user's mobile device 16 further could include the same or another unique identifier of vehicle 12—e.g., a vehicle identification number (e.g., a VIN), a hardware or software identifier, or the like. In at least one example, the identifier is a Bluetooth Low Energy (BLE) universal unique identifier (UUID) which can be transmitted by a BLE beacon signal at the vehicle 12 (e.g., by computer 26). The identifier may be sent to mobile device 16 independent of whether other data is sent thereto.

Following block 505 and/or block 510, computer 14 may establish communication with server 66 (block 515)—e.g., via computer 26 and network connection 76. This may be a wireless connection—e.g., using cellular and/or short-range wireless communication. In some examples, this established communication may be a Wi-Fi or BLE link.

Following block 515, computer 14 may receive reservation data via the established communication with server 66 (block 520). In at least one non-limiting example, computer 14 receives reservation data that includes vehicle feature data (an indication of features to be displayed on display 18).

As described above, computer 14 may use the vehicle feature data to determine feature-selection data. For example, computer 14 may compare vehicle feature data (provided by the user 24) with available features on vehicle 12 and consequently determine the feature-selection data. Of course, some features available to user 24 on vehicle 12 may not have been indicated previously by the user 24 but will inherently be available on the particular vehicle 12; when such features are also called out on the feature checklist screen 22, computer 14 can be programmed to include these features in the feature-selection data (e.g., as they are inherently selected). The features associated with the feature-selection data correspond to the features that computer 14 causes to be illuminated on display 18. However, the illumination of the corresponding light sources 44-56 may occur later (e.g., in block 560, as discussed below).

The reservation data received at computer 14 also may include homing signal information—e.g., in instances where the user 24 configured his/her own desired signal. In an absence of such homing signal information, the computer 14 can use the default homing signal (which may be stored in computer memory 64).

In another non-limiting example, reservation data can include an identifier associated with mobile device 16. For example, an IP address, a MAC address, an international mobile subscriber identity (IMSI), or the like may be sent to computer 14 in the reservation data so that computer 14 may validate the identity of mobile device 16 when it approaches. In another non-limiting example of block 520, computer 14 may receive the reservation data from a computer other than server 66; e.g., from mobile device 16 (e.g., Bluetooth, BLE, Wi-Fi, Wi-Fi Direct, or other suitable connection).

In response to receiving reservation data (block 520), computer 14 may actuate a beacon signal at vehicle 12 (block 525). More specifically, computer 14 may instruct computer 26 to transmit the beacon signal (e.g., via BLE or other suitable wireless protocol). In at least one example, the beacon signal includes an identifier of vehicle 12. In other example, the beacon signal is emitting whenever an ignition system of vehicle 12 is OFF.

In block 530, mobile device 16—carried by user 24—may detect the beacon signal transmitted in block 525. For example, where BLE is used, the mobile device 16 may detect the beacon signal when it is within approximately 70 meters or less of vehicle 12. In addition, as shown in FIG. 1, if vehicle 12 is located near other vehicles (12', 12", 12'"), mobile device 16 may detect a number of beacon signals (e.g., from homing devices associated with displays 18', 18", 18'"). Software stored in memory 84 (device 16) and executable by processor 82 (device 16) may be able to distinguish each of the detected vehicles. In response to detecting the beacon signal(s), processor 82 may execute a graphical user interface portraying the location of mobile device 16 relative to the beacon signals (e.g., of vehicles 12, 12', 12", 12'"). In at least one example, the display 80 of device 16 provides some indication of the relative location and position of vehicle 12 with respect to mobile device 16 (and presumably user 24). In addition, block 530 may include instructions to user 24 (e.g., to 'move closer' to vehicle 12)—e.g., based on signal strength, time of flight (TOF), etc.

After the beacon signal of vehicle 12 is detected, mobile device 16 and computer 14 may attempt to establish a suitable connection (e.g., via BLE and via computer 26) (block 535). Block 535 may include computer 14 validating the identity of mobile device 16 and/or mobile device 16 validating the identity of vehicle 12 (e.g., using the BLE or other identifiers discussed above).

At this point, though user 24 may be proximate to vehicle 12, the user still may not know the precise location of vehicle 12. This particularly may be the case if vehicles 12, 12', 12", 12'" appear—from the outside—to be identical (e.g., same body style, same color, etc.). However, based on the mobile device's ability to connect via BLE, the vehicle 12 may be presumed to be relatively close (e.g., based on a known maximum range of the beacon signal in accordance with a standardized protocol (e.g., BLE protocol), based on a detected signal strength and the associated standardized protocol (e.g., BLE, Wi-Fi protocol). Thus, in block 540, computer 14 may trigger the broadcasting of the homing signal at display 18. Continuing with the example above, homing device 20 (display 18) may emit a predetermined identification sequence (e.g., a sequence of red-green-blue light pulses or the like). And this sequence may be repeated.

In at least one example, this homing signal is not broadcast until the mobile device 16 is within a first threshold proximity (e.g., 20 m, 10 m, 5 m, 1.5 m, or the like). For example, using sensors S1, S2, S3, computer 14 may determine how close mobile device 16 is—e.g., using BLE communications from mobile device 16 and a triangulation algorithm stored in memory 62 (and executable by processor 64). In other instances, the homing signal is broadcast as soon as the mobile device 16 is wirelessly detected (e.g., at 70 m when using BLE protocol).

As will be explained in greater detail below, regardless of how the homing signal is triggered, it only may be triggered when the ignition of vehicle 12 is OFF and the mobile device 16 is determined by computer 14 to be located outside of vehicle 12. Thus, according to one example, homing device 20 also may be used at a later time after the user 24 has left the vehicle 12 (e.g., to enter a store, restaurant, or the like) and then later attempts to find the vehicle 12 again (e.g., in a crowded parking lot). Here again, computer 14 can be programmed to re-actuate the homing device 20 when computer 14 initially detects the mobile device's wireless communication or when the mobile device 16 is within the first threshold proximity.

If computer 14 has not determined already a proximity distance of mobile device 16, computer 14 does so in block 545. As will be explained in greater detail below, it may do so in order to time the illumination of one or more light sources 44-56 on feature checklist screen 22 (display 18). In this manner, power sources (not shown) in vehicle 12 may not be unnecessarily drained while the user 24 is not close enough to vehicle 12 to read and/or interpret the text and/or symbols provided on display 18. It should be appreciated that scenarios exist wherein vehicle 12 and mobile device 16 are in relatively close proximity, but wherein the user 24 has no present intention of entering vehicle 12 (e.g., when the user 24 is at home or office and the vehicle 12 is parked nearby). Computer 14 (in block 545) may use any suitable techniques to determine the proximity distance between the vehicle 12 and mobile device 16 (e.g., including triangulation).

In decision block 550, computer 14 determines whether the mobile device is within a second threshold proximity. The second threshold proximity may be the same as or different from the first threshold proximity discussed above. In one non-limiting example, the second threshold proximity is 1.5 meters. If the determined proximity of mobile device 16 is less than this second threshold proximity, then process 500 proceeds to block 560; otherwise, it proceeds to block 555. (Note: in at least one example, the first and threshold proximities are equal—e.g., first threshold proximity=second threshold proximity=1.5 m; in this manner, power is not consumed unnecessarily by the homing device 20 either.)

In block 555, computer 14 maintains short-range wireless communication (SRWC) with mobile device 16 (e.g., maintains its BLE connection) and continues to monitor and/or re-determine proximity distance of device 16. Thereafter, process 500 loops back and repeats block 550.

In block 560, having determined that mobile device 16 is within the second threshold proximity, computer 14 actuates the feature checklist screen 22 in accordance with the feature-selection data. Thus, in this block, computer 14 selectively may actuate any number of light sources 44-56 based on the user-requested (e.g., and/or paid for) features set forth in the reservation request. For example, continuing with the example shown in FIG. 3, light sources 48, $48_{L5}$, 50, 52, and 54 may be illuminated so that the corresponding texts "Autonomous Level," "L5," "Advanced Snow Features," "Advanced Off Map Features," and "Auto Theater Features" are illuminated. In this manner, with the user 24 nearby (e.g., within 1.5 m), user 24 may further validate that vehicle 12 is his/her selected (e.g., rented) vehicle.

In at least one example of block 560, the same features shown on screen 22 are shown on display 80 of mobile device 16. These may be transmitted to mobile device 16 by server 66; or, in response to determining at computer 14 that the mobile device 16 is within the predetermined threshold proximity (block 550), computer 14 may transmit the feature-selection data to the mobile device 16 via the BLE link. In this manner, user 24 may compare the features listed on display 80 with those on feature checklist screen 22 and confirm that he/she has approached the correct vehicle 12.

In at least one example, the feature checklist screen 22 is illuminated only the first time the mobile device 16 is within the second proximity threshold (block 550)—e.g., one time per vehicle rental agreement period. For example, user 24 may enter and use vehicle 12, later egress vehicle 12, and eventually begin to approach vehicle 12 again (e.g., illustrated as a break in the process 500 between blocks 560 and 565). At this time, according to block 565, computer 14 may re-detect or re-determine mobile device 16 to be within the first threshold proximity (block 540). In response (in block 570), computer 14 may actuate the homing device 20 again and broadcast the homing signal according to the parameters set forth above (e.g., as soon as the mobile device 16 is wirelessly detected, or when the mobile device 16 is within the first threshold proximity (540)). However, computer 14 may not cause the feature checklist screen 22 to be actuated at this time.

In at least one example, blocks 565 and 570 can be repeated any suitable number of times when the user 24 egresses the vehicle 12 (e.g., with mobile device 16), the ignition is switched from ON to OFF, and then the user 24 later returns/approaches—e.g., at least for the duration of the rental agreement. Thereafter, process 500 ends.

Other examples of process 500 exist as well. For example, at an end or conclusion of the rental period (e.g., when the rental agreement terminates), computer 14 may cause text T7 ("Transaction Complete") to be illuminated on the feature checklist screen 22. Text T7 is merely one example of course; other display 18 could provide other suitable indications. To illustrate, e.g., computer 14 may receive an indication that user 24 no longer wishes to use vehicle 12 and/or that user 24 is paid-in-full for his/her rental agreement. Thus, if the vehicle 12 is operating as a taxi and user 24 prepays for the trip, when vehicle 12 reaches the user's desired destination and the user exits vehicle 12, the user 24 may observe "Transaction Complete" illuminated on display 18—thus, obtaining confirmation that he/she does not owe money. Computer 14 may cause a similar or identical message to be transmitted (e.g., via BLE) to the user's mobile device 16. And upon receipt, the software executed on mobile device 16 may cause the message to be displayed on display 80.

Yet other examples of process 500 exist. For instance, the mobile device 16 could provide the reservation request and or reservation data to computer 14 (e.g., via any suitable wired or wireless connection). Thus, server 66 and/or kiosk 86 may not be used in at least one example. Reservation data may be sent to vehicle 12 when the mobile device 16 is located relatively far from the vehicle—e.g., via a cellular communication with vehicle 12. Or user 24 could merely approach vehicle 12 and initiate a reservation request. In some examples, if the vehicle 12 is not available for rental currently—the homing device can transmit such an indication (e.g., it could be solid red or the like); further, this unavailable status of vehicle 12 could be displayed concurrently on the mobile device 16 attempting to rent vehicle 12. More specifically, user 24 may approach vehicle 12 and, using a software application on device 16, attempt to rent vehicle 12 (e.g., via BLE or other SRWC protocol). In response, computer 14 may trigger homing device 20 to display solid red and further cause a message to be sent to mobile device 16 indicating the same.

In other implementations, no mobile device 16 may be required. For example, the kiosk 86 may receive reservation data and provide it to vehicle 12. Once received, computer 14 can actuate homing device 20 and feature checklist screen 22 so that user 24 can approach vehicle (e.g., in a rental corral or the like) and find his/her rental vehicle 12, as well as verify that it is the correct vehicle using both the homing signal and illuminated information on display 18.

In other examples, display 18 may operate as an input device for receiving at least some of the reservation data—e.g., using the touch-sensitive layer 40. For example, user 24 may select which features he/she wishes to be enabled by computer 14 by touching one or more of the enumerated labels on feature checklist screen 22. When a respective label is touched (e.g., labels T1-T6), computer 14 may activate that particular vehicle feature. If a feature is listed on screen 22 which is always operative (or always operative when the vehicle ignition is ON), then computer 14 may cause that particular label to be enabled while user 24 makes his/her selection(s).

Thus, there has been described a feature confirmation system for a vehicle. The system includes a computer that may be programmed to control a homing device and a display that can selectively present at least some available vehicle features. The homing device may be actuated by the computer to attract a user who may be trying to find the respective vehicle. And the presentation of at least some vehicle features may assist the user in verifying he/she has approached the desired vehicle.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. the processor can receive the data from the sensors and determine, from the data, [what the processor is supposed to do]. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and a memory, the memory storing instructions executable by the processor such that the computer is programmed to:
   determine feature-selection data;
   determine that a mobile device is within a proximity threshold of a vehicle; and
   in response to the determinations, control a vehicle display in accordance with the feature-selection data, wherein the display is carried by a vehicle body, wherein a feature checklist screen of the display faces vehicle-outwardly.

2. The computer of claim 1, wherein the computer further is programmed to determine the feature-selection data using reservation data received at the vehicle.

3. The computer of claim 2, wherein the computer further is programmed to receive the reservation data from a mobile device, a server, or a touch-sensitive device in the display.

4. The computer of claim 1, wherein the computer further is programmed to control broadcasting a homing signal when the mobile device is within the proximity threshold.

5. The computer of claim 1, wherein the computer further is programmed to control broadcasting a homing signal when the mobile device is located at a different proximity threshold with respect to the vehicle.

6. The computer of claim 4, wherein the homing signal includes an identification sequence emitted by the display.

7. The computer of claim 6, wherein the broadcasting of the homing signal includes emitting light pulses having different emission frequencies, different intensities, or both.

8. The computer of claim 4, wherein the homing signal comprises a visual signal, an audible signal, a tactile signal, or a combination thereof.

9. The computer of claim 1, wherein the display is located on a B-pillar.

10. The computer of claim 1, wherein at least a portion of the feature checklist screen is illuminated in accordance with the feature-selection data.

11. The computer of claim 1, wherein the feature-selection data is associated with at least one of: one of a plurality of levels of autonomous vehicle control, an advanced vehicle snow system, advanced vehicle map system, automotive theater system, or a vehicle disinfection system.

12. The computer of claim 1, wherein the computer further is programmed to determine that the device is within the proximity threshold using a short-range wireless communication protocol.

13. The computer of claim 1, wherein the computer further is programmed to determine an end of a rental period, and based on determining the end, control the display to provide an indication of the end.

14. A method, comprising:
   determining feature-selection data associated with features available on a vehicle;
   determining that a mobile device is within a proximity threshold of the vehicle; and
   in response to the determinations, controlling a vehicle display to communicate at least some of the feature-selection data to a user, wherein the display is carried by a vehicle body, wherein a feature checklist screen of the display faces vehicle-outwardly.

15. The method of claim 14, wherein the display is located on a B-pillar.

16. The method of claim 14, wherein at least a portion of the feature checklist screen is illuminated in accordance with the feature-selection data.

17. The method of claim 14, further comprising controlling broadcasting a homing signal when the mobile device is located at a different proximity threshold with respect to the vehicle.

18. The method of claim 17, wherein the homing signal includes an identification sequence emitted by the display.

19. The method of claim 18, wherein the broadcasting of the homing signal includes emitting light pulses having different emission frequencies, different intensities, or both.

20. The method of claim 17, wherein the homing signal comprises a visual signal, an audible signal, a tactile signal, or a combination thereof.

* * * * *